United States Patent Office 3,342,728
Patented Sept. 19, 1967

3,342,728
DESALINIZATION OF WATER
Carl J. Malm, Martin E. Rowley, and Nelson G. Baumer, Rochester, N.Y., assignors to Eastman Kodak Company, Rochester, N.Y., a corporation of New Jersey
No Drawing. Filed Sept. 8, 1964, Ser. No. 395,042
5 Claims. (Cl. 210—23)

This invention relates to the desalinization of water using cellulose acetate membranes involving adjustment of the water pH to prolong the life of the membranes used.

The use of cellulose acetate membranes for removing salt from sea water is of current interest as described in an item in the New York Times of Wednesday, June 10, 1964, under a San Diego dateline. This method involves the passing of the saline water over the surface of a cellulose acetate membrane under pressures of 500–1500 pounds per square inch. The fresh water is taken from the opposite side of the membrane through a porous support. A process now in operation for removing salt from saline water is described in Modern Plastics, August 1964, page 111. An article in the Journal of Applied Polymer Science, volume I, pages 133–143 (1959), C. E. Reed and E. J. Breton contains recognition of the value of cellulose acetate membranes for the production of fresh water from saline sources.

The preparation of cellulose acetate membranes useful for the desalinization of water is described in U.S. Patents Nos. 3,133,132 and 3,133,137 of Loeb et al. both dated May 12, 1964. Membranes of this nature show considerable promise for use in the desalinization of water under pressure when the water is applied to the membrane.

A disadvantage of this method of desalting water is the loss of effectiveness of the membrane after it has been used for a time such as on the order of about a month or even a shorter interval of time depending upon the degree of use.

One object of our invention is to provide a method for the desalinization of salt-containing water whereby the effective life of the acetate membrane is substantially prolonged. Another object of our invention is to provide a method of desalinating salt-containing water under non-alkaline conditions. Other objects of our invention will appear herein.

We have found that the effective life of cellulose acetate desalinization membranes is limited because the acetyl content of the membrane is reduced as the desalting procedure is now carried out. This appears to be caused by the slight alkalinity of salt-containing water as occurs from natural sources e.g. brackish water or sea water. We have also found that the acetyl reducing effect of the water on the cellulose acetate membrane is appreciably reduced or eliminated by lowering the pH of that water to within the pH range of about 4.2 to about 7 either by the addition of mineral acid thereto or by using carbon dioxide in the portion of the desalinization procedure where the water comes in contact with the acetate membrane. We have found that when the water being desalted is thus treated the effective life of the cellulose acetate membrane is measurably increased and the rate of reduction of acetyl content is substantially reduced or even eliminated so that the same membrane can be used for long periods of time without losing effectiveness.

To show the effectiveness of the invention accelerated tests were carried out showing that with the use of water without reduced pH the cellulose acetate membrane is so reduced in acetyl that acetone insolubility results whereas reduced pH reduces or eliminates this acetyl removing effect. When the cellulose acetate in the membrane is so reduced in acetyl content as to be insoluble in acetone effectiveness as a selective membrane for the desalinization of water is lost. The following tests were made at atmospheric pressure of various samples of saline water. Sample 1 duplicating the composition of sea water and sample 2 being a saline solution without any sodium carbonate therein. The cellulose acetate used had an acetyl content initially of approximately 40.2%.

STABILITY TESTS OF E-398-3 FILM AS USED IN WATER DESALINIZATION TESTS MADE AT ATMOSPHERIC PRESSURES

| | Preparation of Solutions and Quantity of Film Tested | pH Adjustment (prior to Film addition) | Heating Time and Conditions | pH after Heating | Percent Acetyl and Film Solubility |
|---|---|---|---|---|---|
| (1) | 500 grams of 3.5% NaCl solution, 0.156 grams NaHCO$_3$, 4 grams film. | None (Initial pH of 8.0) | 14 hours; refluxed. | 5.4 | 38.0; acetone insoluble. |
| (2) | 250 grams of 3.5% NaCl solution no NaHCO$_3$, 2 grams film. | 4.5 by adding 1 drop of 0.1 N HCl | do | 4.2 | 39.6; acetone soluble. |

Accelerated tests were also made in closed containers in which the membrane was in contact with simulated sea water but there was no way provided for the $CO_2$ to escape so that the treating water was at a non-alkaline pH over substantially the whole time of treatment. It may be seen that by having $CO_2$ present under pressure during the entire time of treatment hydrolysis of the cellulose acetate was prevented and the cellulose acetate remained acetone soluble.

STABILITY TESTS OF E-398-3 FILM AS USED IN WATER DESALINIZATION TESTS MADE IN CLOSED CONTAINERS

| | Preparation of Solutions and Quantity of Film Tested | pH Adjustment (prior to Film addition) | Heating Time and Conditions | pH after Heating | Percent Acetyl and Film Solubility |
|---|---|---|---|---|---|
| (3) | 250 grams of 3.5% NaCl solution, 0.078 grams NaHCO$_3$, 2 grams film. | 6.5 by adding 0.1 N HCl | 14 hours, steam Bath. | 6.5 | 39.5; acetone soluble. |
| (4) | do | 7.0 by adding $CO_2$ gas | do | 6.5 | 39.9; acetone soluble. |
| (5) | do | 6.4 by adding $CO_2$ gas | do | 6.4 | 40.1; acetone soluble. |
| (6) | do | 5.4 by adding $CO_2$ gas (saturated) | do | 5.8 | 39.8; acetone soluble. |

Also a test was run for an extended length of time using an enclosed container which would correspond to a prolonged use of a cellulose acetate membrane. The results of that test which are as follows show that there was no indication that when water is desalinated in accordance with the invention the cellulose acetate membrane would necessitate replacement after use for long periods of time.

STABILITY TESTS OF E-398-3 FILM AS USED IN WATER DESALINIZATION TESTS MADE FOR EXTENDED LENGTHS OF TIME (CLOSED CONTAINERS)

| | Preparation of Solutions and Quantity of Film Tested | pH Adjustment (prior to Film addition) | Heating Time and Conditions | pH after Heating | Percent Acetyl and Film Solubility |
|---|---|---|---|---|---|
| (7) | 250 grams of 3.5% NaCl solution, 0.078 grams NaHCO$_3$, 2 grams film. | 5.4 by adding CO$_2$ gas (saturated) | 70 hours;[1] steam Bath. | 5.8 | 39.6; acetone soluble. |

[1] Solution was changed after each 24 hour period. pH after heating was that after each 24 hours.

The invention has been described in considerable detail with particular reference to certain preferred embodiments thereof, but it will be understood that variations and modifications can be effected within the spirit and scope of the invention as described hereinabove, and as defined in the appended claims.

We claim:
1. In the method of desalinating impure water containing salt and having a pH above 7 in which method one side of a cellulose acetate membrane is contacted with said impure water under pressure and relatively purer water is collected from the other side of said membrane, the step which comprises adjusting the pH of said impure water to within the range of 4.2–7.

2. In the method of desalinating impure water containing salt and having a pH above 7 in which method one side of a cellulose acetate membrane is contacted with said impure water under pressure and relatively purer water is collected from the other side of said membrane, the step which comprises adding mineral acid to said impure water in an amount only sufficient to adjust the pH of said impure water to the range of 4.2–7.

3. In the method of desalinating impure water containing salt and having a pH above 7 in which method one side of a cellulose acetate membrane is contacted with said impure water under pressure and relatively purer water is collected from the other side of said membrane, the step which comprises adding hydrochloric acid in an amount only sufficient to adjust the pH of said impure water to within the range of 4.2–7.

4. In the method of desalinating impure water containing salt and having a pH above 7 in which method one side of a cellulose acetate membrane is contacted with said impure water under pressure and relatively purer water is collected from the other side of said membrane, the step which comprises supplying $CO_2$ to said impure water while under pressure to thereby adjust the pH of said impure water to 4.2–7.

5. In the method of desalinating impure water containing salt and having a pH above 7 in which method one side of a cellulose acetate membrane is contacted with said impure water under pressure and relatively purer water is collected from the other side of said membrane, the step which comprises adjusting the pH of said impure water to approximately 6.5.

References Cited
UNITED STATES PATENTS

| 2,276,210 | 3/1942 | Lane et al. | 210—22 |
| 2,872,331 | 2/1959 | Grady et al. | 8—129 |
| 3,171,799 | 3/1965 | Batchelder | 210—22 |

JOSEPH SCOVRONEK, *Primary Examiner.*

MORRIS O. WOLK, E. G. WHITBY,
*Assistant Examiners.*

Dedication

3,342,728.—*Carl J. Malm*, *Martin E. Rowley*, and *Nelson G. Baumer*, Rochester, N.Y. DESALINIZATION OF WATER. Patent dated Sept. 19, 1967. Dedication filed Dec. 9, 1968, by the assignee, *Eastman Kodak Company*.

Hereby dedicates to the Public the entire remaining term of said patent.
[*Official Gazette April 29, 1969.*]